United States Patent [19]

Lawrence

[11] E Re. 29,611

[45] Reissued Apr. 18, 1978

[54] BED BASE FOR SUPPORTING A BOX SPRING

[75] Inventor: James Roger Lawrence, Carthage, Mo.

[73] Assignee: Steadley Company, Inc., Carthage, Mo.

[21] Appl. No.: 751,643

[22] Filed: Dec. 17, 1976

Related U.S. Patent Documents

Reissue of:

[64] Patent No.: 3,869,738
Issued: Mar. 11, 1975
Appl. No.: 432,659
Filed: Jan. 11, 1974

[51] Int. Cl.[2] ..... A47C 19/00

[52] U.S. Cl. ..... 5/200 R; 5/131; 5/238

[58] Field of Search ..... 5/131, 200 R, 201, 236, 5/238, 285; 312/140, 263

[56] References Cited

U.S. PATENT DOCUMENTS

| | | | |
|---|---|---|---|
| 984,823 | 2/1911 | Linden | 5/238 |
| 3,368,226 | 2/1968 | Koppel | 5/238 |
| 3,862,784 | 1/1975 | Heinrich | 312/140 |

*Primary Examiner*—Casmir A. Nunberg

*Attorney, Agent, or Firm*—Lee & Smith

[57] ABSTRACT

A box spring mattress is supported a predetermined distance above a floor by a bed base including panels connected at their ends to form a rectangular frame and a pair of cross-supports resting crosswise on the edges of an opposed pair of notched panels. Each cross-support has a generally flat surface which is generally parallel to the floor and on which the box spring rests, and a downwardly pointing brace. The braces nest in the notches in the panels and the support surfaces are essentially flush with the unnotched portion off the notched edges of the panels. Each brace includes notches which lockingly connect with the notches in the panels so that the cross-supports cannot move laterally relative to the base. There are stop members at the opposed ends of each cross-support for restricting the lateral movement of the box spring relative to the base. The panels have their ends slotted and are connected together by receptacles which include a pair of channels each of which has an open top and an open bottom entryway end for receiving a slotted end of a panel by way of top or bottom entry and a flange which points inwardly towards the panel received in the channel and fits snug within the slot in the end of the panel. Because of the construction of the panels, cross-supports, and receptacles, the bed base can be easily assembled and disassembled.

16 Claims, 15 Drawing Figures

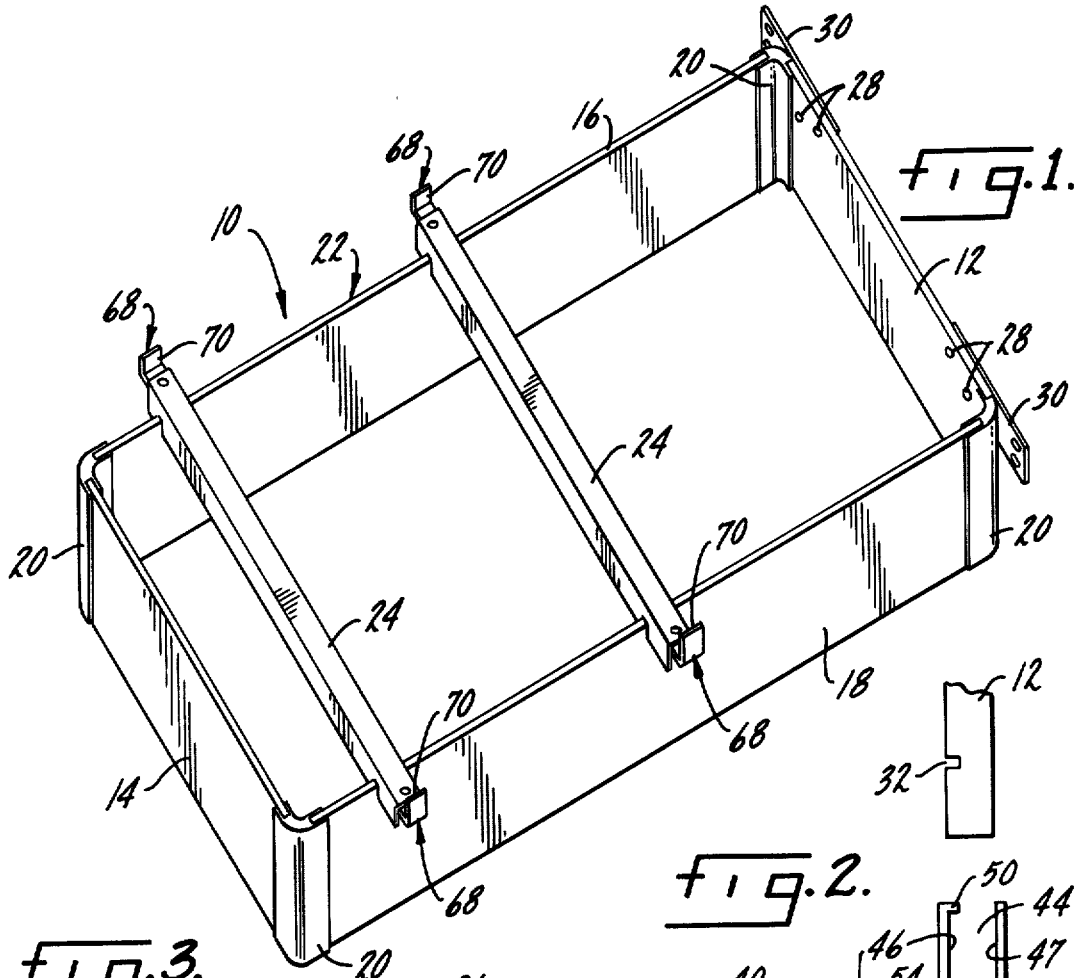
fig. 1.
fig. 2.
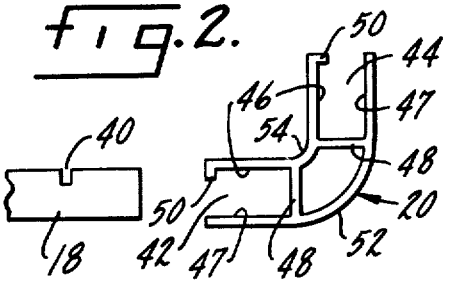
fig. 3.
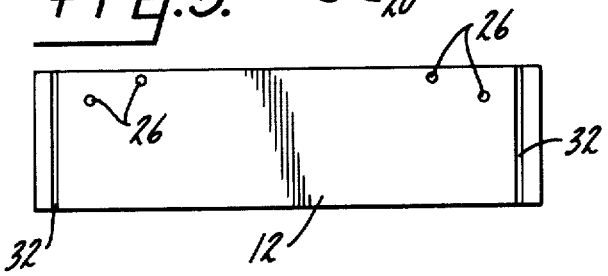
fig. 4.
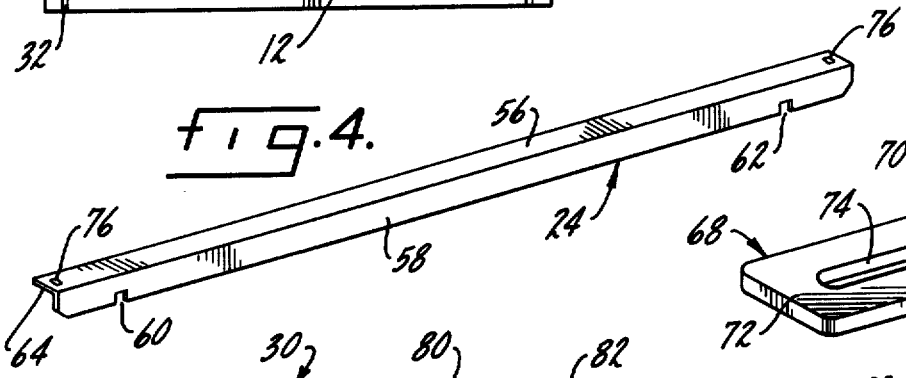
fig. 5.
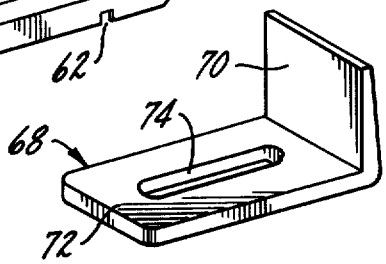
fig. 6.
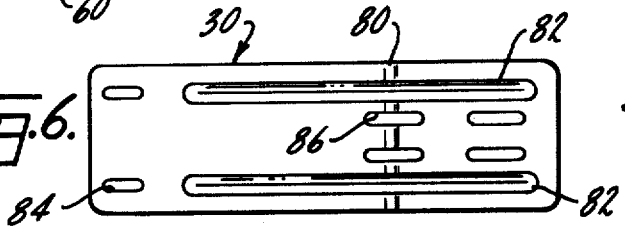
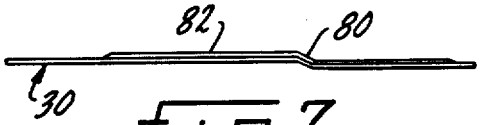
fig. 7.

BED BASE FOR SUPPORTING A BOX SPRING

Matter enclosed in heavy brackets [ ] appears in the original patent but forms no part of this reissue specification; matter printed in italics indicates the additions made by reissue.

BACKGROUND

Hollywood type bed frames are commonly used to support box springs for mattresses. These types of frames are generally unattractive and they permit dust and dirt to collect underneath the box spring. In general, these frames are made from angle irons which must be welded or bolted together. This makes it inconvenient to quickly assemble the frames at the point of installation. Moreover, these conventional type of Hollywood bed frames are heavy, and therefore, expensive to ship.

I have now invented a novel base support which retards the collection of dirt and dust underneath the supported box spring, is easy to assemble and disassemble, and can be shipped with minimum transportation costs. The details of my bed base are disclosed in the attached drawings and described in the accompanying description.

THE DRAWINGS

FIG. 1 is an isometric view of one embodiment of my bed base.

FIG. 2 is an enlarged plan view of one of the corner receptacles used to connect the panels of the bed base together.

FIG. 3 is a side elevational view of the headboard panel shown in FIG. 1.

FIG. 4 is perspective view of one of the cross-supports shown in FIG. 1.

FIG. 5 is a perspective view of one of the stop members which are attached to the opposed ends of the cross-supports.

FIG. 6 is a plan view of a headboard support bracket.

FIG. 7 is an end view of the bracket shown in FIG. 6.

DETAILED DESCRIPTION

First Embodiment

Figures 8, 9, 12, 13, 14, 15:
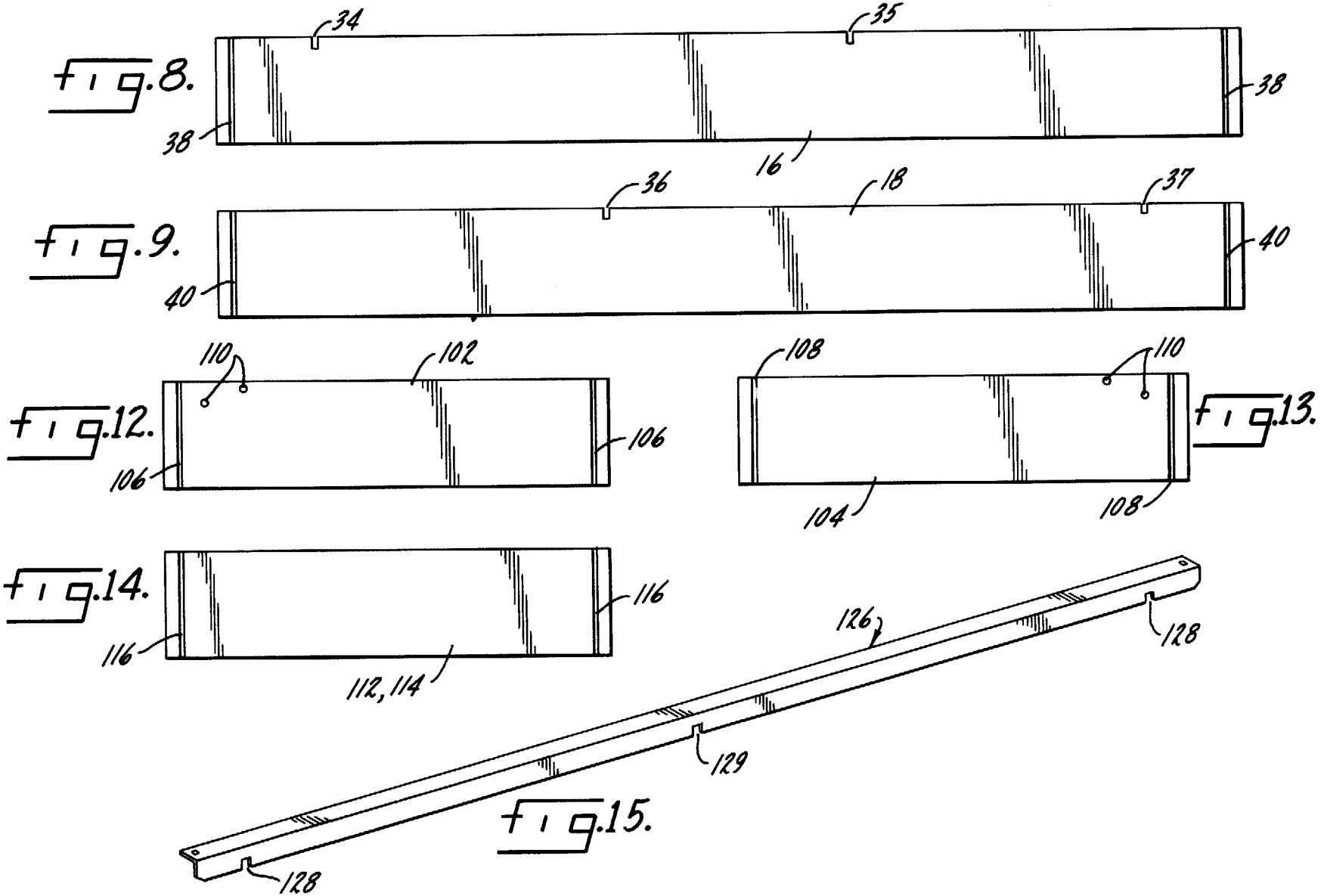
FIG. 8 is a side elevational view of one of the sideboard panels shown in FIG. 1.
FIG. 9 is a side elevational view of the other sideboard panel shown in FIG. 1.
FIG. 12 is a side elevational view of one headboard panel shown in FIG. 11.
FIG. 13 is a side elevational view of the other headboard panel shown in FIG. 11.
FIG. 14 is a side elevational view of one of the footboard panels shown in FIG. 10.
FIG. 15 is a perspective view of one of the cross-support members shown in FIG. 10.

The first embodiment of my bed base 10, as shown in FIGS. 1 through 9, includes a headboard panel 12, a footboard panel 14, and a pair of sideboard panels 16 and 18. Four corner receptacles 20 connect the ends of the panels together to form a rectangular frame 22, and a pair of cross-supports 24, resting on this frame, support a box spring for a mattress (not shown). The panels 12, 14, 16 and 18 are preferably made of an inexpensive pressboard composition, with the exterior surfaces of the panels being covered with a vinyl material which simulates a wood grain finish.

The headboard panel 12 has a width of about 7½ inches, a thickness of about 4/8 inch, and a length ranging from about 27 to 50 inches depending on the width of the box spring being supported. There are two pairs of holes 26 in the upper ends of the headboard panel 12 which receive fasteners 28 (FIG. 1) for securing headboard brackets 30 (FIGS. 6 and 7) to the backside of the headboard panel. Two parallel slots 32 approximately 5/16 inch from the ends of the headboard panel 12 run along the width of this panel. These slots are about one fourth inch deep and about one eighth inch wide.

The footboard panel 14 is identical to the headboard panel except it does not have the holes 26 for the bracket fasteners 28.

As shown in FIGS. 8 and 9, the sideboard panels 16 and 18 are similar to each other and they have the same thickness and width as the headboard and footboard panels 12 and 14. They are longer than the headboard and footboard panels 12 and 14, having a length ranging from about 67 to 72 inches. The upper edges of each of the sideboard panels 16 and 18 includes, respectively, a pair of notches 34, 35 and 36, 37. Notches 34 and 37 are close to the footboard panel 14 and the other notches 35 and 36 are near the center of the sideboard panels 16 and 18, respectively. The notches 34 through 37 each have a width of approximately 5/32 of an inch and are approximately three fourths inch deep. At opposed ends of each of these sideboard panels 16 and 18 running along the width of the panels are parallel slots 38 and 40, respectively, which are displaced inwardly from the ends approximately 5/16 inch. Each of these slots 38 and 40 are about one fourth inch deep and about one eighth inch wide. When the frame 22 is formed, the sideboard panels 16 and 18 are in a right hand/left hand relationship so that the notches 34 and 37 are in registration, and notches 35 and 36 are in registration. *The size, number and location of the notches, if any, are approximate, as one skilled in the art can appreciate.*

As shown in FIG. 2, the corner receptacles 20 are identical, each being an extruded aluminum structure including two channels 42 and 44 at 90° relative to each other and having open top and bottom ends adapted to receive a panel by way of either top or bottom entry. Each channel 42 and 44 includes a pair of flat, parallel sidewalls 46 and 47 separated by a spacer 48. This spacer 48 separates the sidewalls 46 and 47 a distance slightly greater than the thickness of a panel. Integral with the ends of sidewalls 46 is an inwardly pointing flange 50 which fits snug within the slots 40 and 32 in the ends of panels 18 and 12 received in the respective channels 42 and 44. The two channels 42 and 44 are joined together by arcuate connecting walls 52 and 54. The connecting walls 52 and 54 and the sidewalls 45 and 47 have a height equal to the width of a panel, and the spacers 48 are displaced rearwardly from the flanges 50 of the sidewalls 47 a distance about equal to the displacement of a slot from the end of its respective panel. Thus, the dimensions of the channels 42 and 44 are just slightly greater than the dimensions of the end of a panel received in a channel.

As shown in FIG. 4, the cross-supports 24 are angle irons each having a generally flat support surface 56,

*which forms a cross-support having a substantially horizontally extending support element for engaging and supporting a box spring,* and a brace 58 *downwardly extending* at right angles to the support surface. There are a pair of notches 60 and 62 displaced inwardly equal distances from the opposed ends of the cross support 24. *The notches are formed in the brace to accommodate the sideboard panels 16 and 18 so that each brace has downwardly extending outer portions defining the outer limits of the cross-support notches and which are adapted to abut the outer surfaces of the accommodated sideboard panels to support the portions of the cross-support extending outwardly of the sideboard panels, and downwardly extending inner portions defining the inner limits of the cross-support notches and which are adapted to abut the inner surfaces of the accommodated sideboard panels to support the portions of the cross-support disposed between the opposed sideboard panels.* These notches have a width equal to the thickness of the sideboard panels 16 and 18, and a depth sufficient so that, when the cross-supports 24 are aligned with the opposed notches 34, 37 and 35, 36 in the sideboard panels 16 and 18, *or engaging the sideboard panels 16 and 18,* and stretching across the sideboard panels, the underside 64 of the support surface 56 rests on top edges of the sideboard panels 16 and 18. Consequently, the support surfaces 56 are essentially flush [with the unnotched portions of the edges of the sideboard panels 16 and 18 and] *with the top edges of the sideboard panels when the sideboard panels are accommodated within the notches in the braces. If notches are present in the sideboard panels 16 and 18,* the notches 60 in the cross-support braces 58 interlock with the notches 34 and 35, and the notches 62 of these braces interlock with notches 36 and 37. This prevents the cross supports 24 from moving laterally relative to the base 10.

At opposed ends of the cross-supports 24 are stop members 68, each including an upwardly pointing finger 70 and an integral connection piece 72 (FIG. 5) at a right angle to the finger 70. Suitable fasteners (not shown) passing through elongated apertures 74 in the connection pieces 71 and holes 76 in the ends of the cross-supports 24 secure the stop members 68 to the underside 64 of the cross-supports 24. Preferably, these stop members are made of plastic which will not tend to rip a mattress resting on the cross supports 24. Because of the elongated aperatures 74, these stop members 68 may be laterally adjusted to accommodate mattresses varying slightly in width.

As shown in FIGS. 6 and 7, the brackets 30 are generally flat rectangular steel members having a step 80 and ribs 82 which provide rigidity and elongated aperatures 84 and 86. The aperatures 84 receive the fasteners 28 which connect the brackets 30 to the headboard panel 12 and the aperatures 86 receive fasteners (not shown) which connect the brackets to a headboard (not shown).

Second Embodiment

FIGS. 10 through 16 illustrate the second embodiment of my bed base 100 which is particularly designed to support box springs for king size mattresses. Only the salient differences between this embodiment and the embodiment of FIGS. 1 through 9 are described, and components identical to those of the base 10 are given the same numerals.

Figure 10:
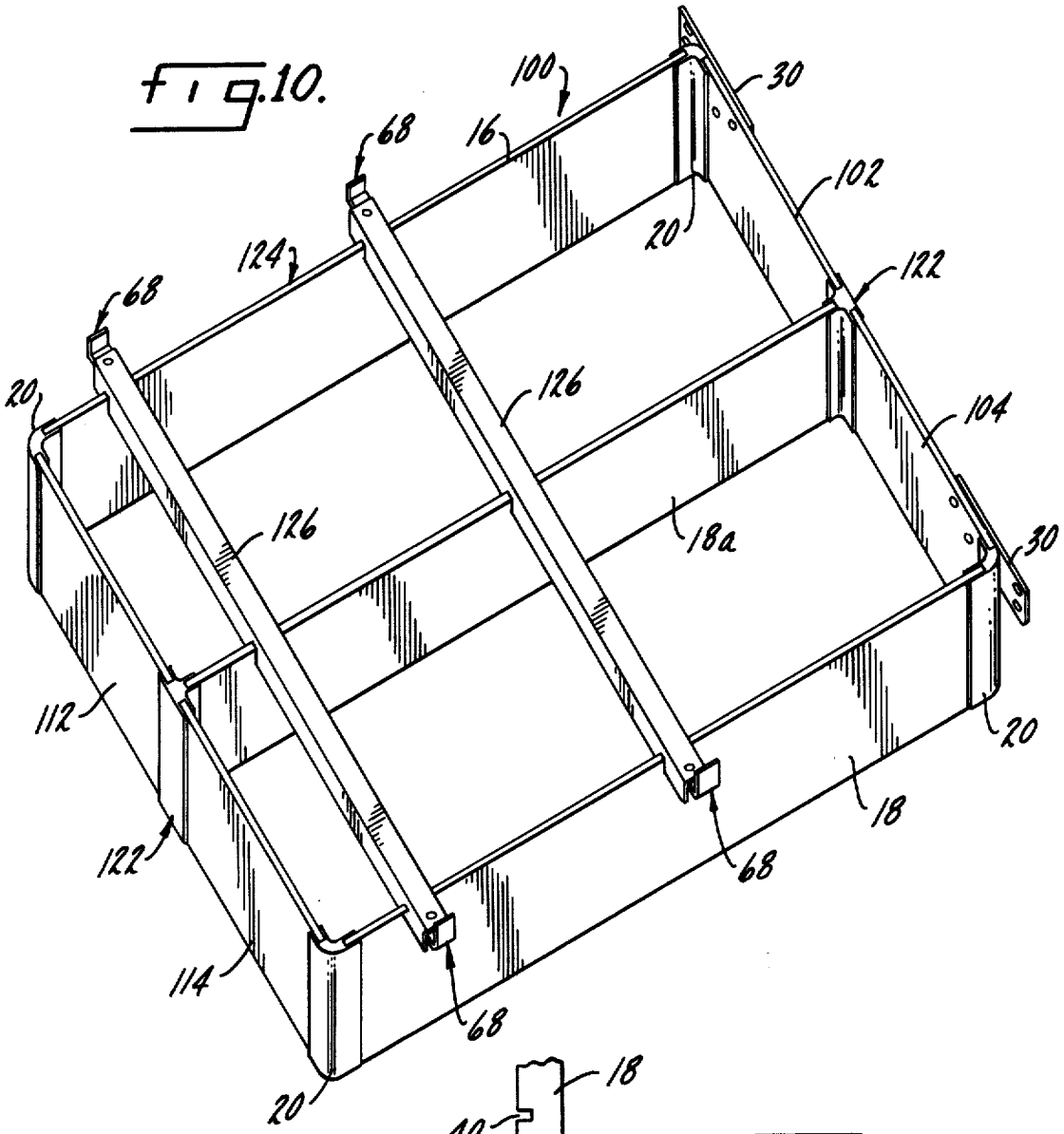
FIG. 10 is an isometric view of a second embodiment of my bed base.

This king size bed base 100 includes a pair of headboard panels 102 and 104 including slotted ends 106 and 108, respectively, and holes 110 for attaching headboard brackets 30 to the respective panels, a pair of footboard brackets 112 and 114, including slots 116, a pair of sideboard panels 16 and 18 and a centerboard panel 18a. The footboard panels 112 and 114 are identical to the headboard panels 102 and 104 except there are no holes 110 in these footboard panels. The upper sideboard panel 16 as viewed in FIG. 10 is identical to the sideboard panel 16 shown in FIG. 8, and the centerboard panel 18a and other sideboard panel 18 are both identical to the sideboard panel 18 shown in FIG. 9. These panels 16, 18 and 18a *preferably* include the notches 34 through 37 and the slots 38 and 40 running along the width of the panels as shown in FIGS. 8 and 9. All the panels have the same width and thickness.

Four identical corner receptacles 20 as described above and two identical T-shaped divider receptacles 122 connect all the panels together as shown in FIG. 10 to form a rectangular frame 124 divided in two about equal sized compartments by the centerboard panel 18a.

A pair of cross-supports 126 resting on the edges of the sideboard panels 16 and 18 and centerboard panel 18a have at their opposed ends plastic stop members 68 as described above. The cross-supports 126 are similar to the cross-supports 24, but are longer and include notches 128 in the ends of their braces in locking connection with the notches, *if present,* in the sideboard panels 16 and 18. In addition, each cross-support 126 also includes a central notch 129 in its brace for locking connection with [the notches in] the centerboard panel 18a.

Figure 11:
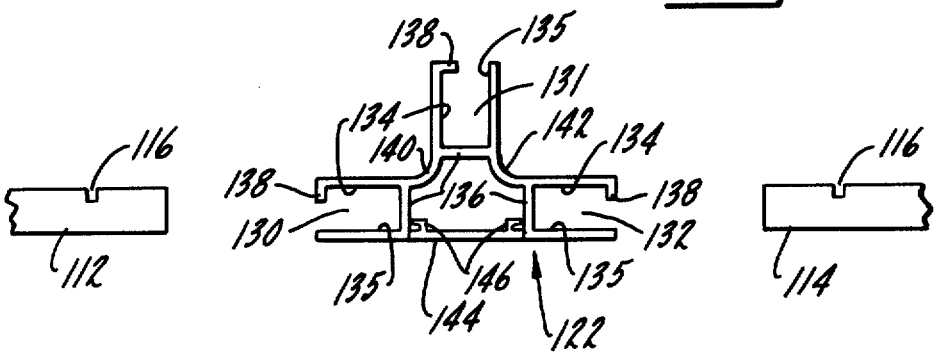
FIG. 11 is an enlarged plan view of the divider receptacle shown in FIG. 10.

The chief difference between the bed base 100 and the bed base 10 is the divider receptacles 122. As shown in FIG. 11, these divider receptacles 122 include three channels 130, 131 and 132. The channel 131 which receives the centerboard panel 18a is centered relative the channels 130 and 132 and is at 90° with respect to the channels 130 and 132. The channels 130 and 132 are at 180° relative to each other. Each channel 130 through 132 includes a pair of flat, parallel sidewalls 134 and 135, a spacer 136 which maintains the sidewalls apart from each other a distance equal to the thickness of a panel, and flanges 138 integral with one of the sidewalls 134. The channel 130 is joined to the channel 131 by an arcuate connecting wall 140, and the channel 131 is joined to channel 132 by an arcuate connecting wall 142. This forms an integral structure which is made preferably from extruded aluminum. A cover 144 fits between the gap between the channels 130 and 132, and it includes tabs 146 which press outwardly to hold the cover snug against the spacers 136. The sidewalls 134 and 135, the connecting walls 140 and 142, and the cover 144 have a height equal to the width of a panel.

The chief advantage of my bed bases 10 and 100 is that these bases are easy to assemble and disassemble. The various panels are connected together to form the frames 22 and 124 by simply sliding the receptacles 20 or 20 and 122 over the ends of the various panels. The cross-supports 24 and 126 are simply set on top of the frames 22 or 124 with the notches in the braces of the cross-supports aligned with the notches in the longitudinal edges of the sideboard panels 16 and 18 or sideboard and centerboard panels 16, 18 and 18a. [The] *If the panels 16, 18 and 18a are notched, the* cross-supports 24 and 126 simply drop into position and interlock with the panels so that they do not move laterally relative to the base. Initially, the stop members 68 are attached to the opposed ends of the cross supports 24 and 126 by fasteners (not shown) which hold the stop members loosely so that these stop members can move laterally relative to the cross-supports. A box spring is placed on the cross-supports between the stop members 68, and the positions of the stop members are adjusted so that these stop members fit snug against the side of the box spring mattress. The fasteners for the stop members 68 are then secured to prevent lateral movement of the box spring relative to the base. Normally, the head end of the mattress is about flush with the headboard panels of the frames 22 and 124 and the foot end of the box spring extends about 6 to 12 inches beyond the footboard panels of the frames 22 and 124. Optionally, the headboard brackets 30 may be fastened to the headboard panels as shown, and a headboard may be secured to these brackets. Although instructions for assembling the bed bases 10 and 100 may be provided, the manner in which these bases are assembled is virtually self explanatory.

With the bed base 10 or 100 assembled with the box spring in position, the area inside the frames 22 and 126 is enclosed, thus retarding the collection of dust and dirt underneath the mattress.

Another advantage of my bed bases 10 and 100 is that metal and plastic components of the bed bases 10 or 100 may be manufactured at a central location while the panels can be made at a number of distant points throughout the country. For example, the corner and divider receptacles, cross-supports, stop members, and headboard brackets are preferably manufactured at one centrally located plant and shipped to different warehouses close to population centers. Locally manufactured panels stored in such warehouses would be packaged or sold with the components made at the central plant. This substantially reduces transportation costs.

As appreciated by those skilled in the art, modifications in my novel bed base may be made without departing from the principles of my invention.

I claim:

1. A bed base for supporting a box spring for a mattress and elevating said box spring a predetermined distance above a floor, comprising panels of equal width resting on their edges and connected at their ends to form a rectangular frame,

[a pair of notches in] *at least one notch formed in each of* a pair of opposed panels at the upper edges in each one of said opposed panels, said [pair of] notches in one panel being in registration with the [pair of] notches in the other panel, and

[a pair of spaced cross-supports] *at least one cross-support* resting crosswise between the pair of notched panels, each of said cross-supports having a generally flat support surface which is generally parallel to the floor and on which the box spring rests, and a downwardly pointing brace, each of said cross-supports being at right angles to the notched panels and aligned with opposed notches in opposed notched panels so that the respective braces of each one of said cross-supports nest in the opposed notches and the support surfaces of said cross-supports are essentially flush with the unnotched portion of the notched edges of said panels.

2. The base of claim 1 including stop members at the opposed ends of the cross-supports for restricting lateral movement of the box spring relative to the base.

3. The bed base of claim 2 in which the opposed ends of the cross-supports extend about equal distances beyond the notched panels.

4. The bed base of claim 1 wherein the cross-supports each include a pair of notches in the brace portion which lockingly connect with the notches in the panels so that the cross-supports cannot move laterally relative to the base.

5. The bed base of claim 1 wherein the panels each have slots in opposed ends running along the width of the panel, said panels being connected together by receptacles each of which includes a pair of channels, said channels each having an open top and an open bottom entryway end for receiving the slotted end of a panel and an inwardly pointing flange which fits snug within the slot in the end of the panel received by said channels.

6. A bed base for supporting a box spring for a mattress, elevating said box spring a predetermined distance above a floor, and restricting lateral movement of the box spring relative the base, comprising a headboard panel and a footboard panel each of equal length, equal width, and equal thickness, a pair of sideboard panels which are longer than the headboard and footboard panels but are equal in length to each other and have widths and thicknesses equal to the widths and thicknesses of the headboard and footboard panels, a pair of notches in each of said sideboard panels along a longitudinal edge of said sideboard panels, said pairs of notches being located in identical positions along said longitudinal edges of their respective panels, said headboard panel, footboard panel, and sideboard panels each having adjacent their respective ends slots running along the widths of said panels, receptacles connecting the ends of said panels together to form a rectangular frame in which the panels rest on their narrow edges at right angles to the floor and the longitudinal axes of the panels are parallel to the floor, said sideboard panels resting on edges opposite the notched edges so that said notches point upwardly and the pair of notches in one sideboard panel are in registration with the pair of notches in the other sideboard panel, each of said receptacles including a pair of channels, each of which has an open top and an open bottom entryway end for receiving a slotted end of a panel by way of top or bottom entry and a flange which points inwardly towards the panel received in the channel and fits snug within the slot in the end of said panel, a pair of spaced cross-supports which rest crosswise between the pair of sideboard panels, and have opposed ends which extend beyond the sideboard panels, each of said cross-supports having a generally flat support surface which is generally parallel to the floor and on which the box spring rests, and a downwardly pointing brace, each of said cross-supports being at right angles to the sideboard panels and aligned with opposed notches in the opposed side panels so that the brace portions of the cross-supports nest in the opposed notches and the support surfaces are essentially flush with the unnotched portion of the notched edges of the sideboard panels, and stop members attached to the opposed ends of the cross-supports which include upwardly pointing finger elements which restrict the lateral movement of the box spring resting on the cross-supports between said stop members.

7. The bed base of claim 6 in which the opposed ends of the cross-supports extend about equal distances beyond the sideboard panels.

8. The bed base of claim 6 wherein each cross-support includes notches in its brace which lockingly connect with the notches in the sideboard panels so that the cross-supports cannot move laterally relative to the base.

9. The bed base of claim 6 including brackets connected to the headboard panels for attaching a headboard to said bed base.

10. A bed base for supporting a box spring for a mattress, elevating said box spring a predetermined distance above a floor, and restricting lateral movement of the box spring relative to the base, comprising a pair of headboard panels and a pair of footboard panels, each of said headboard and footboard panels being of equal length, equal width, and equal thickness, a pair of sideboard panels which are longer than the headboard and footboard panels but are equal in length to each other and have widths and thicknesses equal to the widths and thicknesses of the headboard and footboard panels, a centerboard panel which has a length, width and thickness equal that of the sideboard panels, a pair of notches in each of said sideboard panels and said centerboard panel along a longitudinal edge of each of said sideboard panels and said centerboard panel, said pairs of notches being located in identical positions along the longitudinal edges of their respective panels, said headboard panels, footboard panels, sideboard panels, and centerboard panel each having adjacent their respective ends slots running along the widths of said panels, receptacles connecting the ends of said panels together to form a rectangular frame in which the panels rest on their narrow edges in right angles to the floor and the longitudinal axes of the panels are parallel to the floor, with said centerboard panel being parallel to the sideboard panels to divide the frame into two about equal size compartments, said sideboard panels and said centerboard panels resting on edges opposite said notched edges so that said notches point upwardly and the pair of notches in the respective sideboard panels and centerboard panels are in registration with each other, said receptacles including four corner receptacles which connect the sideboard panels to the headboard and footboard panels and two divider receptacles which connect the centerboard panel to the headboard panels and footboard panels, each of said corner receptacles including a pair of channels which are generally at right angles to each other, and each of said divider receptacles having three channels, two of which are at 180° relative to each other and one of which is centered relative to the other two and at 90° relative to said other two, each of the channels in the corner and divider receptacles having open top and bottom entryway ends for receiving a slotted end of a panel by way of top or bottom entryway and a locking flange which points inwardly towards the panel received in the channel and fits snug within the slot in the end of said panel, a pair of spaced cross-supports which rest crosswise between the sideboard panels and the centerboard panel and have opposed ends which extend beyond the sideboard panels, each of said cross-supports having a generally flat support surface which is generally parallel to the floor and on which the box spring rests, and a downwardly pointing brace, each of said cross-supports being at right angles to the sideboard panels and the centerboard panel and aligned with opposed notches in the sideboard panels and centerboard panels so that the braces of the cross-supports nest in the notches and the support surfaces are essentially flush with the unnotched portion of the notched edges of the sideboard panels and centerboard panel, and stop members attached to the opposed ends of the cross-supports which include upwardly pointing finger elements which restrict the lateral movement of the box spring resting on the cross-supports between said stop members.

11. The bed base of claim 10 adapted to support a box spring for a king size mattress.

12. The bed base of claim 11 wherein each cross support includes notches in its brace which lockingly connect with the notches in the sideboard and centerboard panels so that the cross supports cannot move laterally relative to the base.

*13. A bed base for supporting a box spring for a mattress and elevating said box spring a predetermined distance above a floor comprising*

*a plurality of panels of equal width resting on their edges and interconnected to form a rectangular frame, one pair of opposed panels forming side panels of the frame and the other opposed panels forming end panels of the frame,*

*a plurality of spaced cross-supports extending tranversely across said side panels, each of said cross-supports having a substantially horizontally extending support element for engaging and supporting a box spring and a downwardly extending brace element, said cross-supports having their brace elements notched to accommodate the side panels, each said cross-support brace element having downwardly extending outer portions defining the outer limits of the cross-support notches and adapted to abut the outer surfaces of the accommodated side panels to support the portions of the cross-support extending outwardly of the side panels, and downwardly extending inner portions defining the inner limits of the cross-support notches and adapted to abut the inner surfaces of the accommodated side panels to support the portions of the cross-support disposed between the opposed side panels, the support elements of said cross-supports being essentially flush with the top edges of said side panels when said said panels are accommodated within the notches in the brace element.*

*14. The structure of claim 13 wherein said cross-supports are disposed at right angles with respect to said side panels.*

*15. The structure of claim 13 wherein said side panels are provided with notches to interfit with the notched portions of said cross-supports.*

*16. The structure of claim 13 wherein said downwardly extending brace element outer portions extend to adjacent the outer extremities of the support elements of said cross-support.*

* * * * *